United States Patent [19]

Hoshino et al.

[11] Patent Number: 5,293,372
[45] Date of Patent: Mar. 8, 1994

[54] APPARATUS FOR OPTICALLY RECORDING AND REPRODUCING INFORMATION FROM AN OPTICAL RECORDING MEDIUM

[75] Inventors: Isao Hoshino; Takashi Yoshizawa, both of Yokohama; Takayuki Asano, Hamamatsu, all of Japan

[73] Assignee: Kabushiki Kaisha Toshiba, Kawasaki, Japan

[21] Appl. No.: 728,586

[22] Filed: Jul. 11, 1991

[30] Foreign Application Priority Data

Jul. 13, 1990 [JP] Japan .................. 2-184212

[51] Int. Cl.$^5$ .............................................. G11B 7/00
[52] U.S. Cl. .................................... 369/116; 369/112
[58] Field of Search ............... 369/116, 54, 110, 106, 369/112, 100, 109, 44.24, 44.14, 44.23; 346/76 L; 359/833, 834, 850

[56] References Cited

U.S. PATENT DOCUMENTS

| | | | |
|---|---|---|---|
| 4,689,481 | 8/1987 | Ono | 369/112 |
| 4,870,632 | 9/1989 | Shiono et al. | 369/44.23 |
| 4,881,216 | 11/1989 | Deguchi et al. | 369/116 |
| 4,989,198 | 1/1991 | Kojima et al. | 369/116 |
| 5,067,117 | 11/1991 | Shimizu et al. | 369/116 |

FOREIGN PATENT DOCUMENTS

| | | | |
|---|---|---|---|
| 60-7636 | 1/1985 | Japan . | |
| 0122942 | 6/1986 | Japan | 369/110 |
| 0013131 | 1/1988 | Japan | 369/112 |
| 63-13143 | 1/1988 | Japan . | |
| 0119025 | 5/1988 | Japan | 369/44.24 |
| 0269325 | 11/1988 | Japan | 369/110 |
| 2-64928 | 3/1990 | Japan . | |
| 0017847 | 1/1991 | Japan | 369/109 |

Primary Examiner—W. R. Young
Assistant Examiner—Thang V. Tran
Attorney, Agent, or Firm—Oblon, Spivak, McClelland, Maier & Neustadt

[57] ABSTRACT

In an information recording/reproducing apparatus, a light beam emitted from a semiconductor laser is guided to a beam splitter. The light beam passing through an incident surface of the splitter is splitted into first and second light beam by a beam splitting layer. The first beam passing through the splitting layer is emerged from a first emerging surface and guided to an optical disk. The first light beam after being reflected from the optical disk is returned to the first emerging surface and passes through the first emerging surface. The returned first light beam passed through a second emerging surface and defected by a detector so that a retrieving signal is generated from a detector. The second light beam reflected from the beam splitting layer is directed to a concave mirror of the splitter and is converged on a mirror detector through a third emerging surface so that a mirror signal for controlling the semiconductor laser is detected.

21 Claims, 9 Drawing Sheets

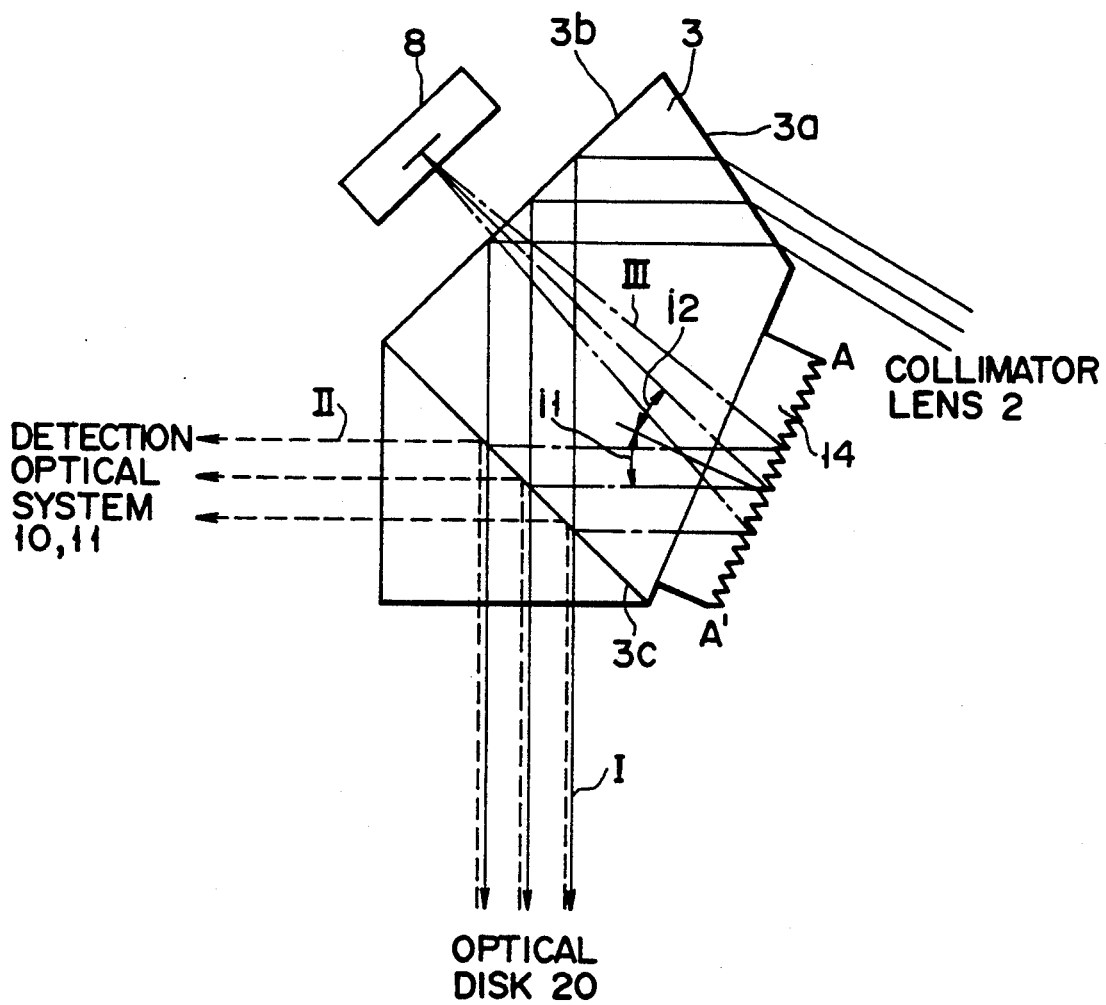
F I G. 5

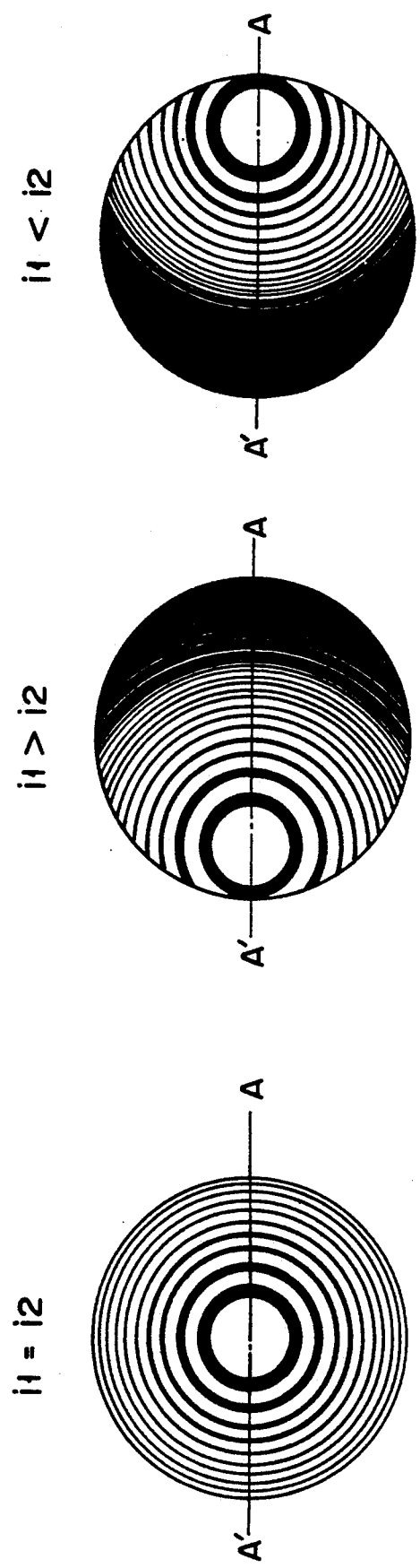

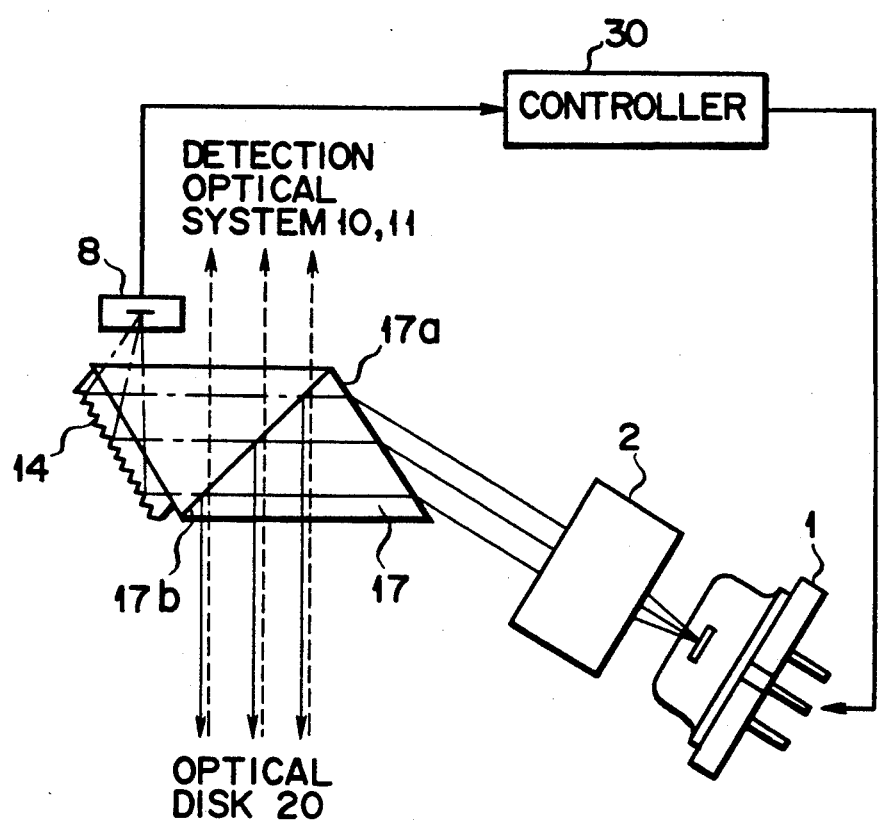
F I G. 11

APPARATUS FOR OPTICALLY RECORDING AND REPRODUCING INFORMATION FROM AN OPTICAL RECORDING MEDIUM

BACKGROUND OF THE INVENTION

1. Field of the Invention

The present invention relates to an optical information recording/reproducing apparatus for optically recording information on an optical disk or optical memory and optically reproducing the information therefrom.

2. Description of the Related Art

In a optical information recording/reproducing apparatus, a semiconductor laser is used as a light source for generating a light beam. In the type of optical information recording/reproducing apparatus, the light beam is converged onto an optical disk or an optical memory by an objective lens. The light beam reflected from or optical disk is returned to the semiconductor laser through the objective lens. If the light beam returns to the semiconductor laser, the optical intensity of the light beam emitted from the semiconductor laser may be adversely affected, with the result that information cannot be reliably recorded or reproduced from the optical disk. In particular, in an opto magnetic recording/reproducing apparatus wherein information is recorded on a magneto-optical recording medium (e.g., a magneto-optical disk), a change which the light beam may have in a plane of polarization is detected, so that the light beam is not completely prevented from returning to the semiconductor layer. More specifically, when the magneto-optical recording/reproducing apparatus is in the recording mode, a recording light beam is irradiated onto the recording surface or layer of the optical disk. With the direction of magnetization of the recording layer being changed by the recording light beam, information is recorded on the disk. When the magneto-optical recording/reproducing apparatus is in the reproduction mode, the direction of polarization of the light beam reflected by the recording layer is changed in accordance with the direction of magnetization of the recording surface, so as to reproduce the information from the disk. That is, the plane of polarization of the light beam reflected by the recording layer is modulated in accordance with the information. In the detection optical system of the magnet-optical recording/reproducing apparatus, therefore, a change which the recording surface has in the direction of polarization is detected. In the magnet-optica recording/reproducing apparatus, an optical element, such as a beam splitter, is arranged between the semiconductor laser and the optical disk, so as to separate the light beam returning from the magneto-optical disk from the light beam directed toward the magneto-optical disk. However, since the optical element cannot completely separate the two light beams, part of the light beam directed to the magneto-optical disk undesirably returns to the semiconductor laser. In order to reliably operate the semiconductor laser, the conventional optical recording/reproducing apparatus separates part of the light beam emitted from the semiconductor laser to the optical disk from the remaining parts and causes the separated part of the light beam to be detected by a photodetector. In accordance with a detection signal from the photodetector, the driving current to be supplied to the semiconductor laser is controlled in such an magnet-optical manner as to stabilize the optical intensity of the light beam emitted from the semiconductor laser. Examples of such a light beam-detection optical system are shown in FIGS. 1 and 2. In the detection optical system shown in FIG. 1, a beam splitter 18 separates part of the light beam emitted from a semiconductor laser 1 from the remaining parts, and the separated part of the laser beam is detected by a photodetector 8 without being processed. Such a detection system is disclosed in Published Unexamined Japanese Patent Application No. 63-13143. In the detection system shown in FIG. 2, a beam splitter 18 separates part of the light beam emitted from a semiconductor laser 1 from the remaining parts, and the separated part of the laser beam is detected by a photodetector 8 after being condensed by a convergent lens 19.

Problems mentioned below are pointed out with respect to the conventional detection systems mentioned above. With respect to the system which does not incorporate a convergent lens, it is difficult to provide the light-receiving surface with an appropriate area. If this area is too large, a large amount of detection beam will be received by the light-receiving surface, but the junction capacitance of the photodetector will be large. If the area is too small, a sufficient amount of detection beam will not be received by the light-receiving surface. In either case, the controllable range of the driving current to be supplied to the semiconductor laser cannot be widened, so that the optical intensity of the light beam emitted from the semiconductor laser cannot be stabilized reliably. With respect to the system which incorporates a convergent lens, the light-receiving efficiency of the photodetector may be improved, but the size of the optical system is undesirably increased in accordance with the focal length of the convergent lens.

As mentioned above, the conventional optical information recording/reproducing apparatus has problems in that the light-receiving surface of the photodetector, which receives a monitor light beam, must have a large area to improve a light receiving efficiency. If the light-receiving surface of the photodetector have an magnet-optical large area, the control band width of the system is narrowed. In the case where the conventional optical information recording/reproducing apparatus incorporates a convergent lens so as to improve the light-receiving efficiency of the photodetector, the size of the optical system is increased in accordance with the focal length of the convergent lens.

SUMMARY OF THE INVENTION

Accordingly, an object of the present invention is to provide an optical information recording/reproducing apparatus wherein the controllable range of driving current to be supplied to the semiconductor laser can be widened, with no need to increase both the size of the optical system and the area of the light receiving surface of the photodetector.

According to the present invention, there is provided an apparatus which optically reproduces information from an optical recording medium and which comprises:

beam-generating means for generating a light beam;

splitting means for splitting the light beam into a first light beam and a second light beam;

guide means for guiding the first light beam to the optical recording medium and returning the first light beam after being reflected by the optical recording medium to the splitting means;

optical responsive means, responsive to the first light beam returned to the splitting means, for generating a reproduction signal;

reflecting/converging means for reflecting and converging the second light beam obtained by the splitting means; and condensed by the reflecting/converging means, for driving the beam-generating means so as to generate a light beam.

According to the present invention, there is also provided an apparatus which optically reproduces information from an optical recording medium and which comprises:

beam-generating means for generating a light beam;

splitting means, including a refractor having a light-incidence surface and first, second and third emerging surfaces, for splitting the light beam incident on the light-incidence surface into a first light beam and a second light beam, the first light beam emerging from the first emerging surface;

guide means for guiding the first light beam emerging from the first emerging surface to the optical recording medium, for returning the first light beam after being reflected by the optical recording medium to the first emerging surface, the first light beam returned to the first emerging surface being directed to the second emerging surface;

signal-generating means, responsive to the first light beam directed to the second emerging surface, for generating a reproduction signal;

reflecting/converging means, secured to the splitting means, for reflecting and converging the second light beam obtained by the splitting means and directing the second light beam to the third emerging surface; and driving means, responsive to the condensed second light beam emerging from the third emerging surface, for driving the beam-generating means so as to generate a light beam.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows the optical system which is employed in an optical information recording/reproducing apparatus according to the second embodiment of the present invention;

FIGS. 6A, 6B and 6C are plan views each showing a pattern of the reflection type grating lens shown in FIG. 5;

FIGS. 7A, 7B and 7C are sectional views taken along lines A-A' shown in FIGS. 6A, 6B and 6C, respectively; and FIGS. 8, 9, 10 and 11 show optical systems which are employed in information recording/reproducing apparatuses according to other embodiments of the present invention, respectively.

DETAILED DESCRIPTION OF THE PREFERRED EMBODIMENTS

Optical information recording/reproducing apparatuses according to embodiments of the present invention will now be described, with reference to the accompanying drawings.

Figure 1:
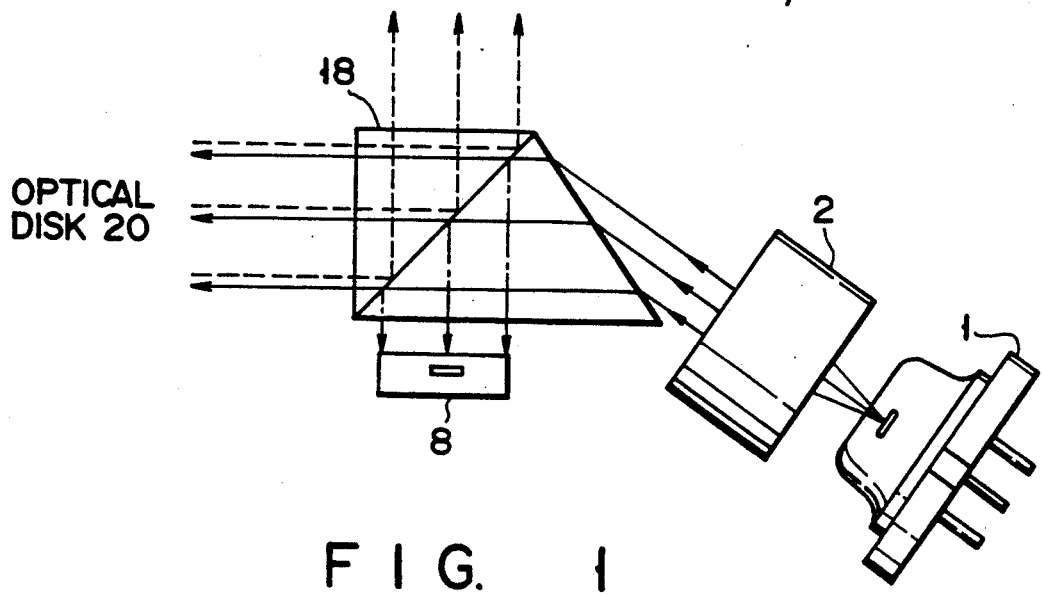
FIGS. 1 and 2 show part of the optical system employed in a conventional optical information recording/reproducing apparatus.
Figure 2:
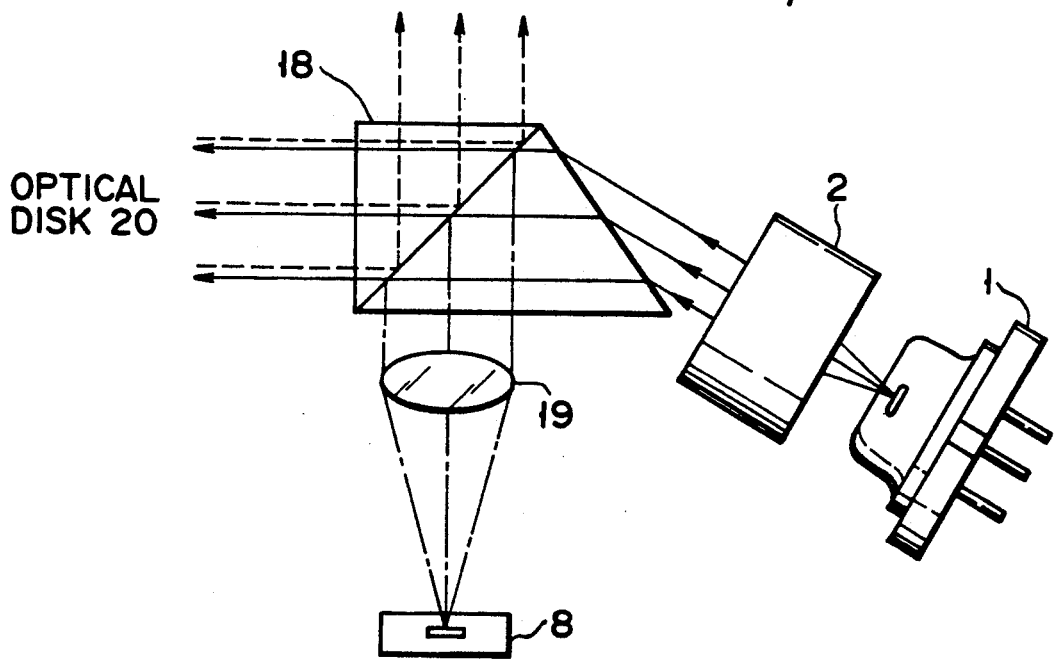
Figure 3:
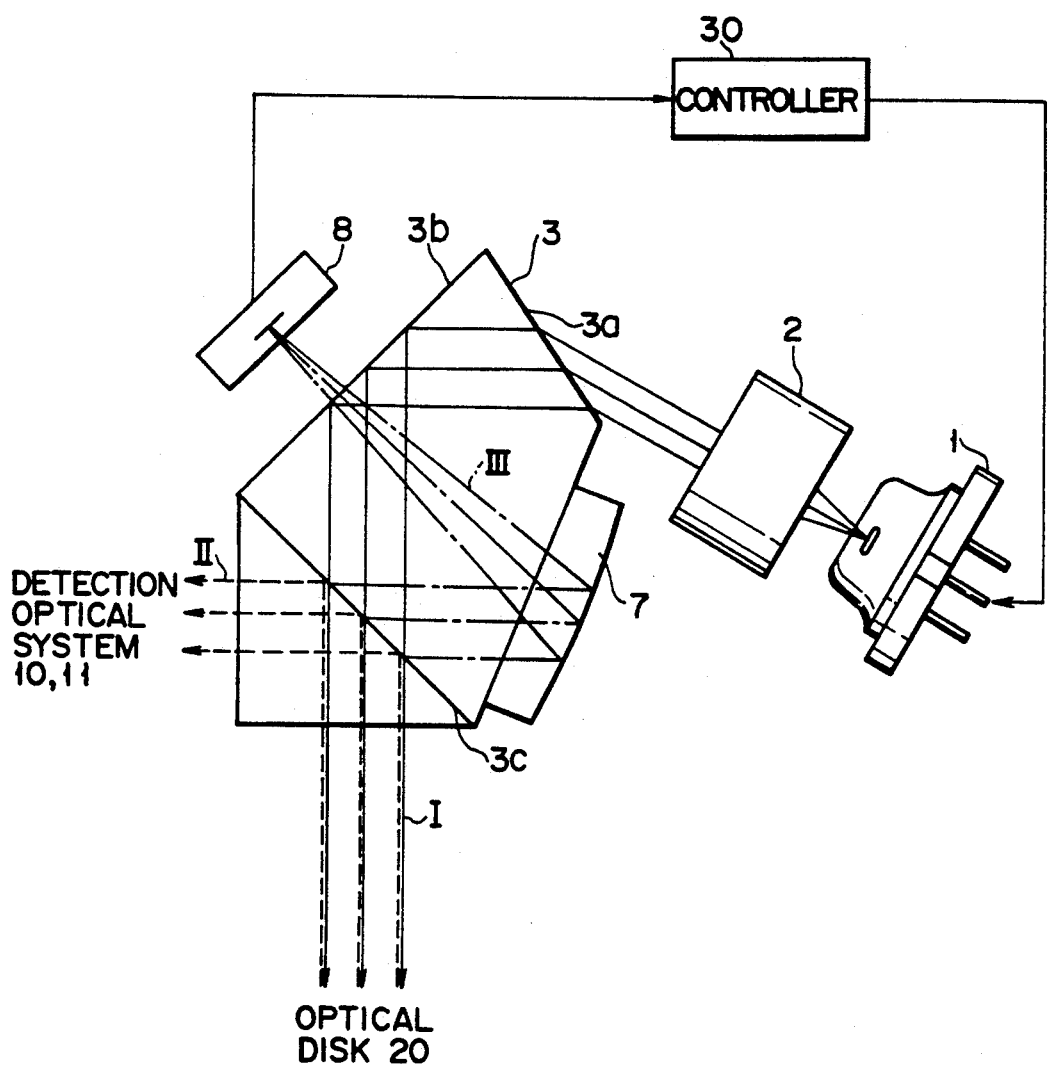
FIG. 3 shows a separate optical system which is employed in an optical information recording/reproducing apparatus according to the first embodiment of the present invention.
Figure 4:
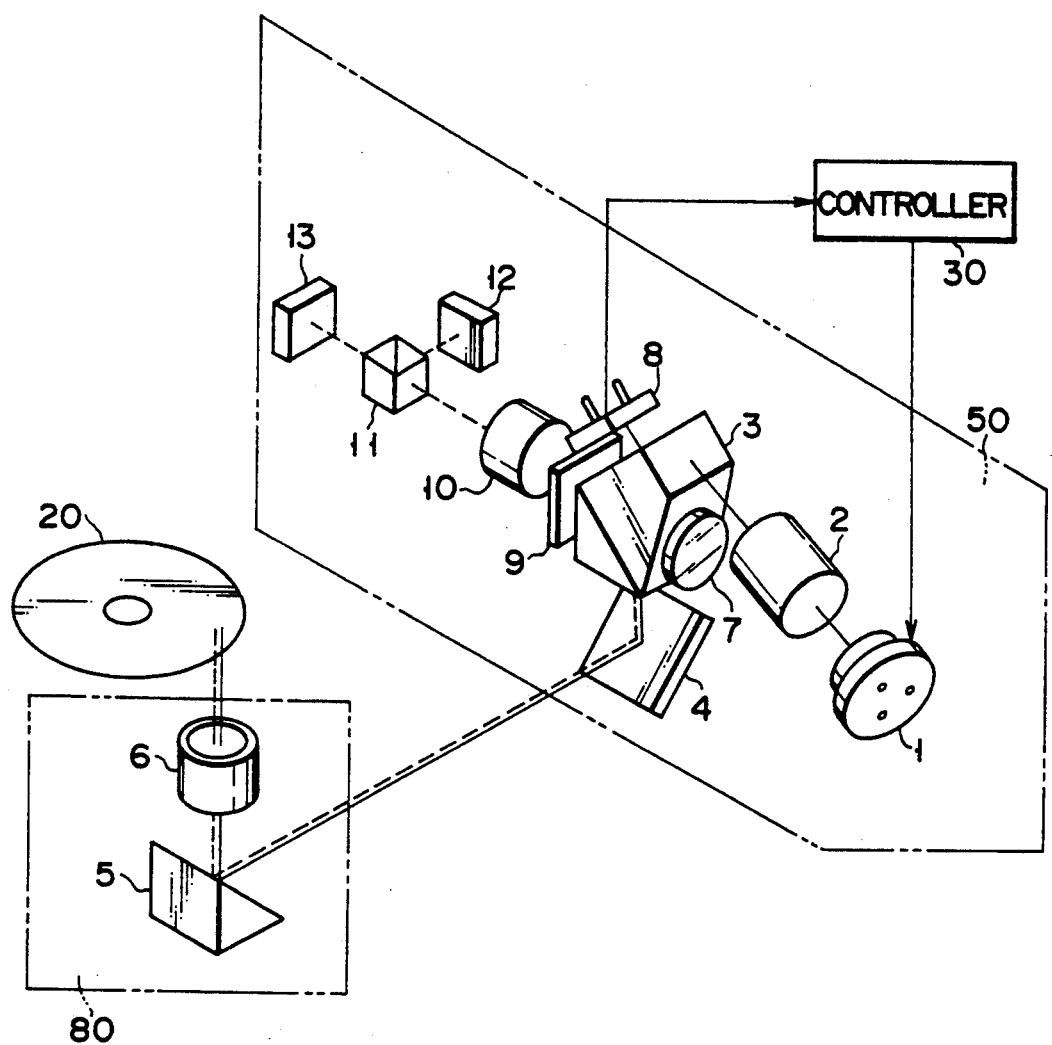
FIG. 4 shows the entire optical system of the optical information recording/reproducing apparatus which incorporates the separate optical system shown in FIG. 3.

FIG. 3 shows the beam-splitting optical system employed in the first embodiment of the present invention, and FIG. 4 shows the entire optical system of an optical information recording/reproducing apparatus which incorporates the beam-splitting optical system depicted in FIG. 3.

As is shown in FIG. 4, the beam-splitting optical system of the optical information recording/reproducing apparatus is comprised of a fixed optical system 50 and a movable optical system 80. In addition to this beamsplitting optical system, the information recording/reproducing apparatus comprises a controller 30. A driving current to be supplied to a semiconductor laser 1 is controlled in accordance with a control signal produced by the controller 30, so as to control the optical intensity of a laser beam to be generated by the semiconductor laser 1. The semiconductor laser 1 is included in the fixed optical system 50, and a light beam emitted from the semiconductor laser 1 is collimated by a collimator lens 2 and is then incident on an optical block 3 which incorporates a beam splitter 3C used for splitting the collimated light beam. The optical block 3 has a first surface 3a, and the inclination angle of this first surface 3a is determined such that the light beam emitted from the semiconductor laser 1 and having an anisotropic intensity distribution is converted into a light beam having an isotropic intensity distribution. Therefore, the light beam having an elliptical cross section is converted by the first surface 3a into a light beam having a circular cross section. As is shown in FIG. 3, the optical block 3 splits the light beam emitted from the semiconductor laser 1 into three light beams: one being a light beam which passes along first optical path I (indicated by the solid lines in FIG. 3) and is directed toward an optical disk 20; another being a light beam which passes along second optical path II (which is indicated by the broken lines in FIG. 3) and is directed toward a detection optical system 10, 11; and the other being a light beam which passes along third optical path III (which is indicated by the dot-and-dash lines in FIG. 3) and is directed toward a photodetector 8. Inside the optical block 3, the light beam subjected to beam shaping is totally reflected by the second surface 3b. Most parts of the totally reflected light beam are transmitted through a beam splitter 3c, and the remaining parts are reflected by the beam splitter 3c. The beam splitter 3c is made by either a semi-transparent mirror or a polarizing beam splitter. The light beam transmitted through the beam splitter 3c passes along first optical path I and is output from the optical block 3. The light beam reflected by the beam splitter 3c passes along third optical path III, is condensed by a concave mirror 7 attached to the second surface 3b of the optical block 3, and is directed toward the second surface 3b. The light beam reflected by the concave mirror 7 passes through the fourth surface of the optical block 3 and is focused on the light-receiving surface of the photodetector 8, which is located slightly away from the fourth surface of the optical block 3.

The photodetector 8 produces a detection signal whose level corresponds to the optical intensity of the light beam emitted from the semiconductor laser 1. The detection signal is supplied to the controller 30. In response to the detection signal, the controller 30 supplies a driving current to the semiconductor laser 1, so that the optical intensity of the light beam emitted from the semiconductor laser 1 is controlled in accordance with the level of the detection signal. As a result, the optical intensity of the light beam emitted from the semiconductor laser 1 is maintained at a substantially constant value.

As is shown in FIG. 4, the light beam passing through the optical block 3 is incident on a galvano-mirror 4, by which the light beam is slightly defected. After being bent approximately 90°, the light beam is directed to the movable optical system 80, which includes a mirror 5 and a objective lens 6. In the movable optical system 80, the light beam is reflected by the mirror 5 and directed to the objective lens 6. By the objective lens 6, the light beam is focused on the recording surface of the optical disk 20. As a result, a tiny beam spot is formed on the recording surface of the optical disk 20.

In the recording mode of the apparatus, the semiconductor laser 1 emits a light beam whose optical intensity is modulated in accordance with information to be recorded, and the intensity-modulated light beam is guided to the optical disk 20 to which a magnetic field is applied. Therefore, in the case where the optical disk 20 is a magneto-optical recording type, the magnetic domain of the recording surface of the optical disk 20 is reversed in accordance with the light beam. On the other hand, in the reproducing mode of the apparatus, the semiconductor laser 1 emits a light beam whose optical intensity is constant and is modulated and reflected by the recording surface of the optical disk 20. In other word, in the case where the optical disk 20 is a magneto-optical recording type, the plane of polarization of the light beam reflected by the optical disk 20 is rotated in accordance with the magnetic domain of the recording surface.

The light beam reflected by the optical disk 20 passes through the movable optical system 80 once again and is returned to the fixed optical system 50. In the stationary optical system 50, the light beam is reflected by the galvanomirror 4, is reflected by the beam splitter 3c of the optical block 3, passes along second optical path II, and is then directed from the optical block 3 toward a ¼ wavelength plate 9. After the plane of polarization is rotated 45° by the ¼ wavelength plate 9, the light beam is focused by a convex lens 10 and is then directed toward a polarization beam splitter 11. The polarized-beam splitter 11 is arranged to form an angle of 45° with reference to the plane of polarization of the light beam incident on the splitter 1. By the polarization beam splitter 11, the light beam is split into two light beams, and these light beams are detected by photodetectors 12 and 13, the light-receiving surface of each of which is divided into three sections. With detection signals output from the photodetectors 12 and 13 being processed by means of a signal-processing circuit (not shown), a focusing error detection signal, a tracking error detection signal and an information reproduction signal are obtained.

The focus detection method used in the first embodiment is a so-called beam size method. In the beam size method, two photodetectors (i.e., photodetectors 12 and 13 in the first embodiment), each having a three-division light-receiving surface, are arranged in the vicinity of the focusing point of a convergent lens (i.e., convex lens 10 in the first embodiment), and a change in the shape of the beam spot which is formed on the three-division light-receiving surface of each photodetector is differentially detected, for the generation of a focusing signal. More specifically, the signals derived from two of the divisions of each photodetector, which is located at both sides, are added together to obtain a sum signal, and the signal derived from the remaining division of each photodetector is subtracted from the sum signal, thereby producing a focusing signal. In response to this focusing signal, the objective lens 6 is maintained in an in-focus state. Thus, the light beam output from the objective lens 6 is focused on the optical disk 20, thus forming a minimum beam spot on the optical disk 20. The signals derived from the three divisions of the light-receiving surface of each photodetector 12, 13 are added together, for the generation of a reproduction signal. This reproduction signal is generated in correspondence to an emboss region of the optical disk 20 (the emboss region being formed in the optical disk and representing recorded information) or a region where the reflectance changes. Further, an image of a wobble bit, which is formed in the optical disk 20 as an embossed region beforehand, is detected by the two photodetectors 12 and 13, so as to generate a tracking error signal used for tracing a bit array on the recording surface of the optical disk 20. In other words, the sum of the outputs of the photodetectors 12 and 13 is sampled by a wobble bit section, and a tracking error signal is detected on the basis of the comparison between the amplitudes of the signals obtained by the photodetectors 12 and 13. With the tracking error signal being supplied to a driving circuit (not shown) which drives the galvanomirror 4, the galvanomirror 4 is tilted, thus deflecting a light beam. Due to this defection, the tracking guide or recording information is traced with the light beam.

In the optical information recording/reproducing apparatus shown in FIGS. 3 and 4, an optical system is employed, which derives a monitor light beam from the light beam emitted from the semiconductor laser 1 to the recording surface of the optical disk 20 and which condenses and reflects the monitor light beam. By adopting such an optical system, the light beam can be focused on photodetector 8, with no need to increase the size of the entire apparatus. Even if the light-receiving surface of the photodetector 8 is small in area, most of the monitor light beam can be detected, thus enabling the light beam emitted from the semiconductor laser 1 to be controlled in a stable manner. It should be also noted that the controllable rang of the driving current supplied to the semiconductor laser 1 can be widened. Because of these advantages, it is possible to provide an optical information recording/reproducing apparatus which can change the light beam output of the semiconductor laser 1 when the light beam reflected by the recording surface of the optical disk 20 is returned to the semiconductor laser 1 and which therefore ensures stable and reliable information recording/reproducing operations.

FIG. 5 shows the optical system employed in the second embodiment of the present invention. In the optical system shown in FIG. 5, a grating lens 14 is employed in place of the concave mirror 7 shown in FIG. 3. In the optical system incorporating the grating lens 14, the detector 8 need not be located at a specific position; it can be arranged at an arbitrary position in the space in front of the fourth surface of the optical block 3. The reason for this will be described below.

As one example of the grating lens mentioned above, a Fresnel lens 14 is well known wherein the center of the lens and the geometric center of the grating patter coincides with each other, as is shown in FIGS. 6A and 7A. In the Fresnel lens 14, the incident angle i1 of incidence of a light beam and the diffraction angle i2 of reflection of that light beam are equal to each other (i1=i2), as in the concave mirror. Therefore, the direction in which the light beam reflected by the Fresnel lens 14 is directed is dependent on the direction of the optical block's third surface to which the Fresnel lens 14 is attached, and the direction in which the photodetector 8 should be arranged is determined, accordingly. In the case where the grating lenses 14 wherein the center of the lens and the geometric center of the grating pattern do not coincide with each other (see FIGS. 6B and 7B and FIGS. 6C and 7C) are employed, the diffraction angle i2 of reflection and the incident angle i1 of incidence are different from each other. For example, the angle of diffraction i2 is narrower than the incident angle i1 of incidence in the grating lens shown in FIGS. 6B and 7B, and is wider than the incident angle i1 of incidence in the grating lens shown in FIGS. 6C and 7C. Therefore, the direction in which the light beam reflected by the grating lens 14 is directed is not dependent only on the direction of the third surface; the grating pattern of the lens 14 is also a factor which determines the direction in which the light beam is directed. This being so, the position at which the photodetector 8 is arranged can be determined in consideration of both the direction of the third surface and the grating pattern of the lens 14. Accordingly, the inclination of the third surface of the optical block 3 and the photodetector 8 can be arranged with a higher degree of freedom, and the entire apparatus can be made small in size.

Figure 8:
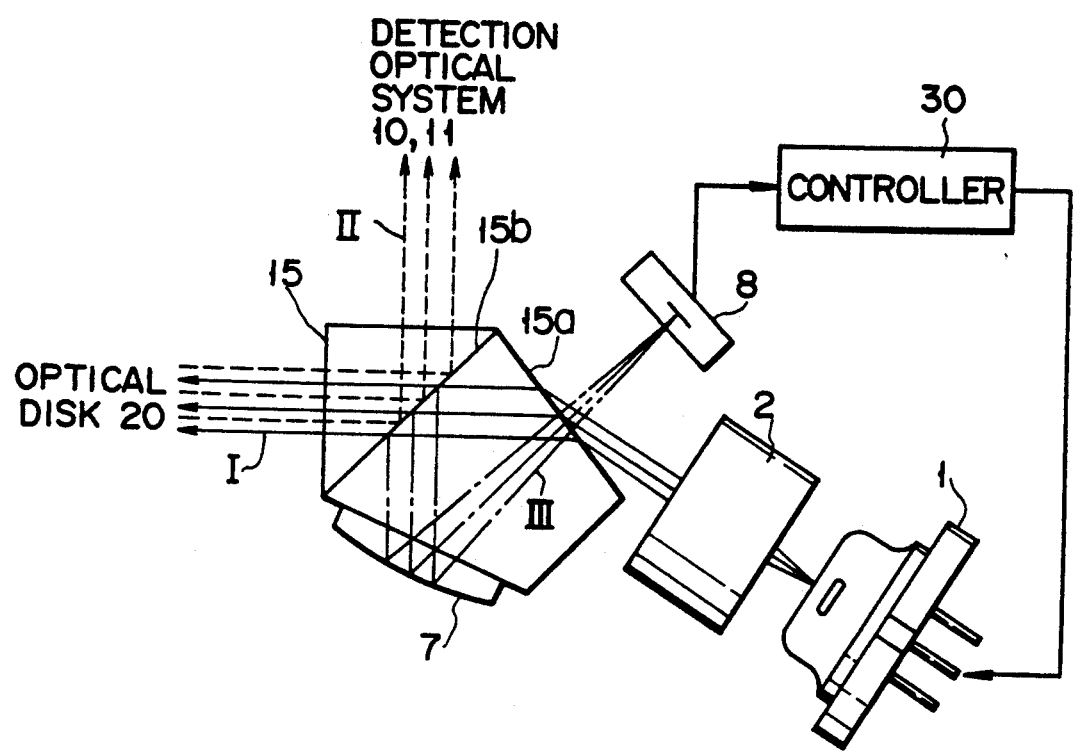

FIG. 8 shows an optical system whose optical block 15 differs in structure from that shown in FIG. 3. In the optical system shown in FIG. 8, a light beam emitted from the semiconductor laser 1 is first collimated by a collimator lens 2 and is then incident on the optical block 15. Like the first surface 3a of optical block 3, the first surface 15a of optical block 15 has a beamshaping function. That is, the first surface 15a of optical block 15 is inclined such that the light beam emitted from the semiconductor laser 1 and having an anisotropic intensity distribution is converted into a light beam having an isotropic intensity distribution. After the beam shaping, the light beam is split by a beam splitter 15b into two light beams, one being directed to the optical disk and the other being used for the detection of the optical intensity of the light beam emitted from the semiconductor laser 1. The light beam reflected by the beam splitter 15b is reflected by the concave mirror 7 toward the first surface 15a of the optical bock 15, and is focused on the light-receiving surface of the photodetector 8, which is located slightly away from the optical block 15. As a reflection type light converging element, the grating lens 14 shown in FIG. 5 may be employed in place of the concave mirror 7.

Figure 9:
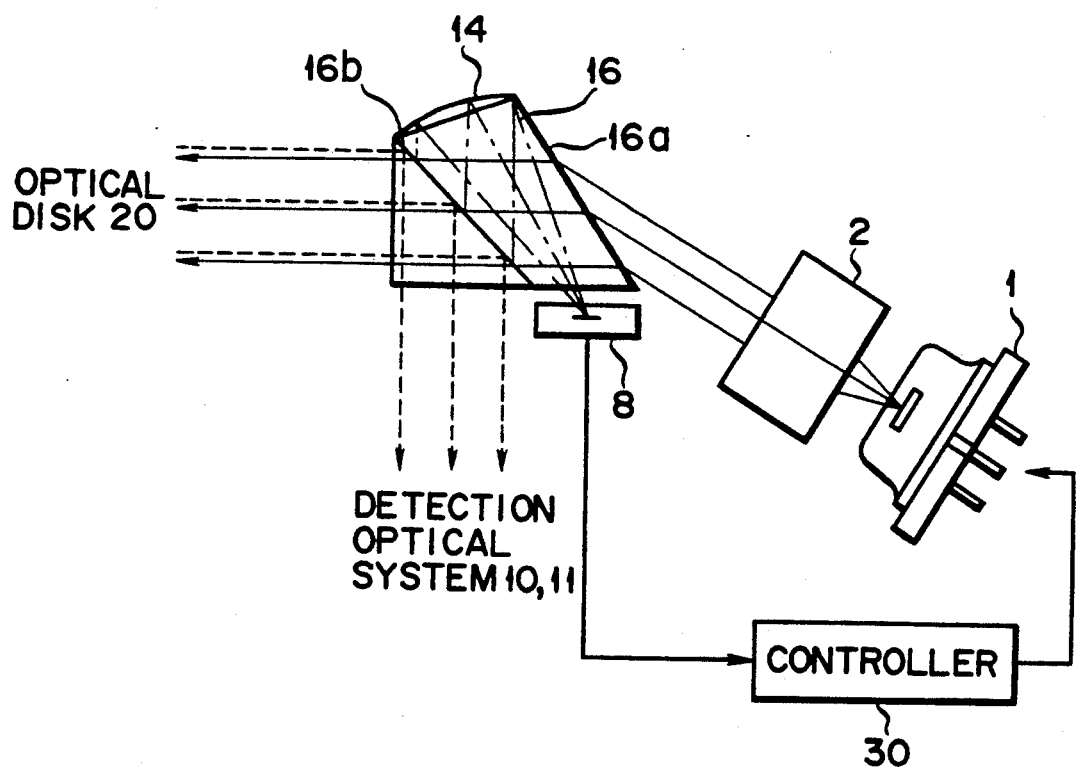

FIG. 9 also shows a modification of an optical system according to the invention. In this optical system, a optical block 16 is modified but an optical arrangement and optical elements or parts are similar as that of the embodiment described above. Thus, detail description of the modification of an optical system shown in FIG. 9 is omitted.

Figure 10:
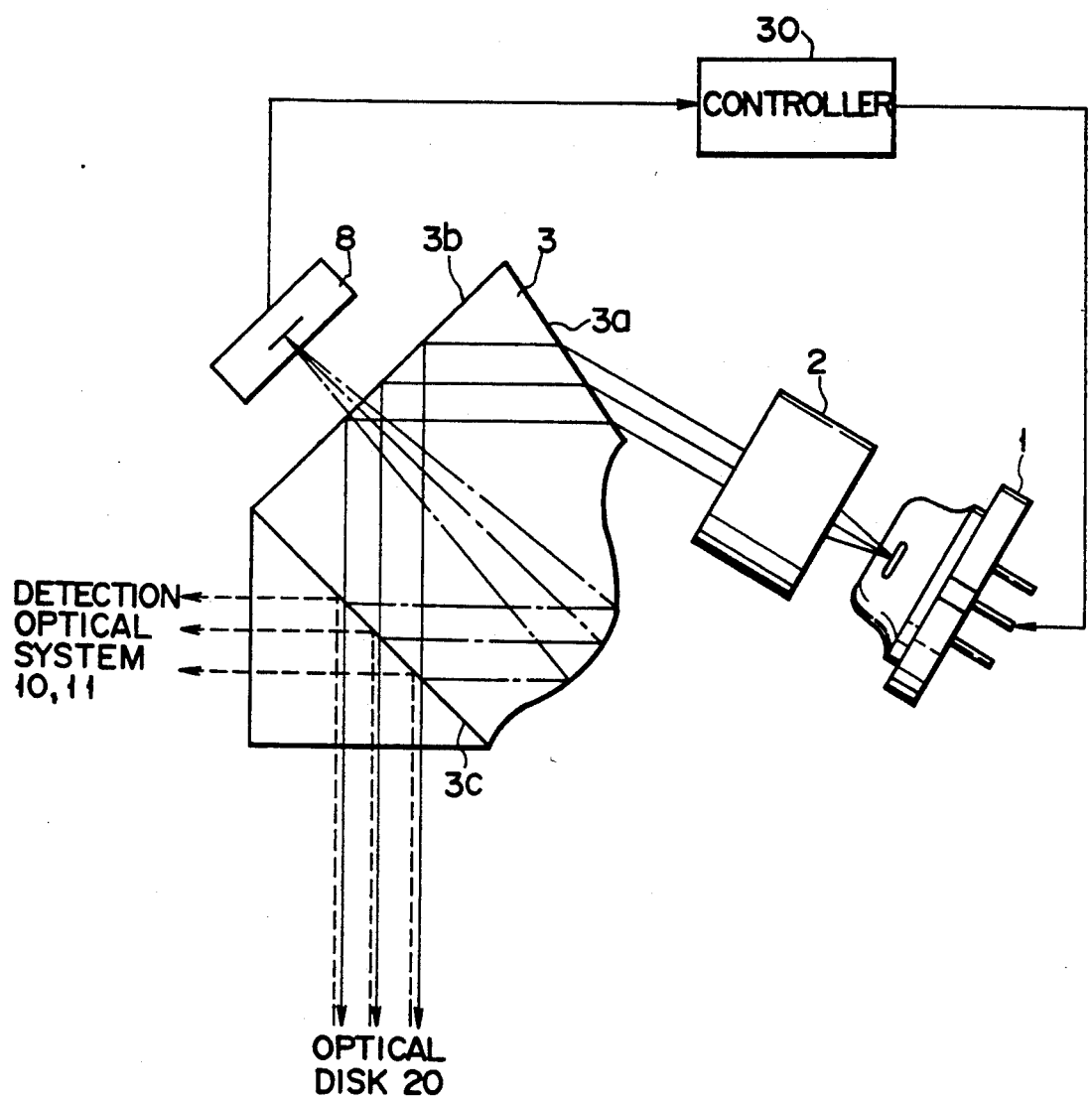

The present invention is not limited to the embodiments mentioned above. For example, the reflection type light-converging element may be integral with the optical block, as is shown in FIG. 10. In the structure shown in FIG. 10, a reflection type light-converging function is provided for one surface of the optical block 3, 15, 16, 17 instead of employing the concave mirror shown in FIGS. 3 and 8 or the Fresnel lens 14 shown in FIG. 5. The effect of the reflection type light-converging element remains unchanged in this structure as well. Not only the reflection type light-converging element but other structural elements may be modified in various manners as long as the modification do not depart from the spirit and scope of the present invention.

Furthermore, a optical system may be employed, as is shown in FIG. 11. In the optical system, a light beam is split into two light beams by the beam splitter 17b of the optical block 17, as in the optical system shown in FIG. 3. In the optical system shown in FIG. 11, however, the light beam reflected by the beam splitter 17b is directed toward the optical disk 20, while the light beam transmitted through the beam splitter 17b is directed to a grating lens. The light beam from the grating lens is converged on the photodetector 8. The optical system shown in FIG. 11 is compact in size and ensures reliable detection of a monitor light beam. Needless to say, the grating lens 17 employed in the optical system shown in FIG. 11 may be replaced with the concave mirror shown in FIG. 3.

As has been described, the optical information recording/reproducing apparatus of the present invention employs an optical system which derives a monitor light beam from the light beam emitted from the semiconductor laser and controls the optical intensity of the light beam emitted from the semiconductor laser in accordance with the monitor light beam. The optical system employs an optical block including a beam splitter, and in this optical block, the monitor light beam is reflected and condensed by the reflection type light-converging element. With this structure, the monitor light beam can be reliably detected, with no need to increase the size of the optical system. Since the monitor light beam can be detected with high efficiency even if the light-receiving surface of the photodetector is small in area, the junction capacitance of the photodetector can be as small as possible, and the controllable range of the driving current supplied to the semiconductor laser can be widened.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for optically reproducing information from an optical recording medium, comprising:
   beam-generating means for generating a light beam;
   splitting means for splitting the light beam into a first light beam and a second light beam;
   guide means for guiding the first light beam to the optical recording medium in a first direction and returning the first light beam after being reflected by the optical recording medium to the splitting means, said splitting means directing said returned light beam in a second direction different than said first direction;
   signal-responsive means, responsive to the first light beam returned to the splitting means in said second direction, for generating a reproduction signal;
   reflecting/converging means, fixed to the splitting means, for reflecting and converging the second light beam split by the splitting means in a third direction back through said splitting means, said third direction being different than the first and second directions; and
   driving means, responsive to the second light beam converged by the reflecting/converging means, for driving the beam-generating means, so as to control an intensity of the light beam.

2. An apparatus according to claim 1, wherein said splitting means includes a beam-splitting layer for splitting said light beam.

3. An apparatus according to claim 1, wherein said splitting means includes a beam-splitting layer for splitting said light beam, said beam-splitting layer producing said first light beam by transmission of a portion of the light beam directed from the beam-generating means, reflecting the first light beam returned from the optical recording medium, and producing said second light beam by reflecting a portion of the light beam directed from the beam-generating means and directing the second light beam to the reflecting/converging means.

4. An apparatus according to claim 1, wherein said splitting means includes a beam-splitting layer for splitting said light beam, said beam-splitting layer producing said first light beam by reflecting a portion of the light beam directed from the beam-generating means, allowing reflection of the first light beam returned from the optical recording medium, and producing said second light beam by transmission of a portion of the light beam directed from the beam-generating means and directing the second light beam to the reflecting/converging means.

5. An apparatus according to claim 1, wherein said reflecting/converging means includes a concave mirror.

6. An apparatus according to claim 1, wherein said reflecting/converging means includes a Fresnel lens.

7. An apparatus according to claim 1, wherein said reflecting/converging means includes a grating lens, said grating lens having an angle of incidence at which the second light beam is incident, and an angle of diffraction which differs from the angle of incidence and at which the second lens is diffracted.

8. An apparatus according to claim 1, wherein the driving means includes a photo-converting means, having a photo-sensitive region, for converting the light beam into a detection signal, and control means for controlling the beam-generating means in response to the detection signal.

9. An apparatus according to claim 8, wherein the light beam includes a principle light ray, and the photo-sensitive region of the photo-converting means is so arranged as to receive the principle light ray at an incident angle inclined to the photo-sensitive region.

10. An apparatus for optically reproducing information from an optical recording medium comprising:
    beam-generating means for generating a light beam;
    splitting means, including a refractor having a light-incidence surface on which said light beam generated by said beam-generating means is incident, and first, second and third light-emerging surfaces, for splitting the light beam incident on the light-incidence surface into a first light beam and a second light beam, the first light beam emerging from the first emerging surface;
    guide means for guiding the first light beam emerging from the first emerging surface to the optical recording medium, for returning the first light beam after being reflected by the optical recording medium to the first emerging surface, the first light beam returned to the first emerging surface being directed to and emerging from the second emerging surface;
    signal-generating means, responsive to the first light beam emerging from the second emerging surface, for generating a reproduction signal;
    reflecting/converging means, secured to the splitting means, for reflecting and converging the second light beam split by the splitting means and directing the converged second light beam to the third emerging surface to emerge from said third emerging surface; and
    driving means, responsive to the converged second light beam emerging from the third emerging surface, for driving the beam-generating means, so as to control an intensity of the light beam.

11. An apparatus according to claim 10, wherein the incident surface and third emerging surface are continuous to each other to form a common surface.

12. An apparatus according to claim 10, wherein the second and third emerging surfaces are continuous to each other to form a common surface.

13. An apparatus according to claim 10, wherein said splitting means includes a beam-splitting layer for splitting said light beam.

14. An apparatus according to claim 10, wherein said splitting means includes a beam-splitting layer for splitting said light beam, said beam-splitting layer producing said first light beam by transmission of a portion of the light beam directed from the beam-generating means, reflecting the first light beam returned from the optical recording medium, and producing the second light beam by reflecting a portion of the light beam directed from the beam-generating means and directing the second light beam to the reflecting/converging means.

15. An apparatus according to claim 10, wherein said splitting means includes a beam-splitting layer form splitting said light beam, said beam-splitting layer producing said first light beam by reflecting a portion of the light beam directed from the beam-generating means, allowing transmission of the first light beam returned from the optical recording medium and producing said second light beam by transmission of a portion of the light beam directed from the beam-generating means and directing the second light beam to the reflecting-/converging means.

16. An apparatus according to claim 10, wherein said reflecting/converging means includes a concave mirror.

17. An apparatus according to claim 10, wherein said reflecting/converging means includes a Fresnel lens.

18. An apparatus according to claim 10, wherein said reflecting/converging means includes a grating lens, said grating lens having an angle of incidence at which the second light beam is incident, and an angle of deflection which differs from the angle of incidence and at which the second light beam is diffracted.

19. An apparatus according to claim 10, wherein said splitting means includes a beam-splitting layer for splitting said light beam, said beam-splitting layer producing said first light beam by reflecting a portion of the light beam directed from the beam-generating means, allowing transmission of the first light beam returned from the optical recording medium, and producing the second light beam by transmission of a portion of the light beam directed from the beam-generating means and directing the second light beam to the reflecting/converging means.

20. An apparatus according to claim 10, wherein the driving means includes a photo-converting means, having a photo-sensitive region, for converting the light beam into a detection signal, and control means for controlling the beam-generating means in response to the detection signal.

21. An apparatus according to claim 20, wherein the light beam includes a principle light ray, and the photo-sensitive region of the photo-converting means is so arranged as to receive the principle light ray at an incident angle inclined to the photo-sensitive region.

* * * * *